(12) United States Patent
Vereshchagin et al.

(10) Patent No.: US 11,441,921 B2
(45) Date of Patent: Sep. 13, 2022

(54) METHOD OF AND SERVER FOR GENERATING PARKING SUGGESTIONS TO BE DISPLAYED ON AN ELECTRONIC DEVICE

(71) Applicant: YANDEX EUROPE AG, Lucerne (CH)

(72) Inventors: Aleksey Ivanovich Vereshchagin, Armavir (RU); Petr Andreevich Kalinin, Nizhny Novgorod (RU)

(73) Assignee: YANDEX EUROPE AG, Lucerne (CH)

( * ) Notice: Subject to any disclaimer, the term of this patent is extended or adjusted under 35 U.S.C. 154(b) by 463 days.

(21) Appl. No.: 16/718,144

(22) Filed: Dec. 17, 2019

(65) Prior Publication Data
US 2020/0200562 A1 Jun. 25, 2020

(30) Foreign Application Priority Data
Dec. 21, 2018 (RU) .......................... RU2018145552

(51) Int. Cl.
*G06F 16/00* (2019.01)
*G01C 21/36* (2006.01)
*G06F 16/28* (2019.01)
*G06N 5/04* (2006.01)

(52) U.S. Cl.
CPC ....... *G01C 21/3685* (2013.01); *G06F 16/285* (2019.01); *G06N 5/04* (2013.01)

(58) Field of Classification Search
CPC .................................................. G06F 16/285
USPC ......................................... 701/424; 707/737
See application file for complete search history.

(56) References Cited

U.S. PATENT DOCUMENTS

| 7,516,010 B1 | 4/2009 | Kaplan et al. |
| 7,538,690 B1 | 5/2009 | Kaplan et al. |
| 7,805,239 B2 | 9/2010 | Kaplan et al. |
| 7,949,464 B2 | 5/2011 | Kaplan et al. |

(Continued)

FOREIGN PATENT DOCUMENTS

| CN | 102235876 A | 11/2011 |
| CN | 104169990 A | 11/2014 |

(Continued)

OTHER PUBLICATIONS

Russian Search Report dated Aug. 20, 2020 issued in respect of the Russian Patent Application No. RU2018145552.

*Primary Examiner* — Alexandria Y Bromell
(74) *Attorney, Agent, or Firm* — BCF LLP

(57) ABSTRACT

A method and a server for determining parking suggestions for a destination location on a map comprising: acquiring based on the destination location, a set of past routes having been taken on the map by users and terminating at the destination location. A set of final locations associated with the set of past routes is determined, each final location being an actual ending location of users having taken the respective past route. A road graph including a set of map objects is acquired, where each map object has: a respective object location, a respective object class indicative of a respective type of structure on the map. The set of final locations is then clustered based on the destination location, the respective classes and the respective final locations to obtain a set of clusters on the road graph, where each cluster includes a respective subset of final locations.

20 Claims, 7 Drawing Sheets

(56) References Cited

U.S. PATENT DOCUMENTS

| | | | |
|---|---|---|---|
| 8,217,806 B2 | 7/2012 | Kim et al. | |
| 8,484,151 B1 | 7/2013 | Lookingbill et al. | |
| 8,665,118 B1 | 3/2014 | Woodard et al. | |
| 8,779,940 B2 | 7/2014 | Amir | |
| 8,779,941 B2 | 7/2014 | Amir | |
| 8,797,187 B2 | 8/2014 | Harber et al. | |
| 8,843,307 B1 | 9/2014 | Kolodziej | |
| 8,947,261 B1 | 2/2015 | Woodard et al. | |
| 8,963,740 B2 | 2/2015 | Koukoumidis et al. | |
| 8,994,560 B2 | 3/2015 | Anderson et al. | |
| 9,026,351 B2 | 5/2015 | Morimoto et al. | |
| 9,151,628 B1 | 10/2015 | Saito et al. | |
| 9,200,921 B2 | 12/2015 | Iwuchukwu et al. | |
| 9,299,256 B2 | 3/2016 | Chen et al. | |
| 9,299,257 B2 | 3/2016 | Beaurepaire et al. | |
| 9,443,428 B2 | 9/2016 | Amir | |
| 9,470,540 B1 | 10/2016 | Castellucci et al. | |
| 9,652,986 B2 | 5/2017 | Belzner et al. | |
| 9,671,237 B1 | 6/2017 | Eliassi et al. | |
| 9,747,797 B1 | 8/2017 | Ghosh et al. | |
| 9,754,487 B1 | 9/2017 | Woodard et al. | |
| 9,778,341 B2 | 10/2017 | Banerjee et al. | |
| 9,786,175 B1 | 10/2017 | Ullrich et al. | |
| 9,805,602 B2 | 10/2017 | Tobolski et al. | |
| 9,812,015 B1 | 11/2017 | Cox et al. | |
| 9,870,707 B2 | 1/2018 | Korman | |
| 9,939,287 B2 | 4/2018 | Castellucci et al. | |
| 9,959,761 B2 | 5/2018 | Tsyrklevich | |
| 10,089,640 B2* | 10/2018 | de Souza | G06F 16/285 707/707 |
| 2009/0024430 A1* | 1/2009 | Marcus | G06Q 10/06375 705/7.34 |
| 2011/0133957 A1 | 6/2011 | Harbach et al. | |
| 2011/0224899 A1* | 9/2011 | Mathews | G01C 21/3685 701/533 |
| 2012/0161986 A1* | 6/2012 | Amir | H04W 4/44 340/932.2 |
| 2012/0262305 A1 | 10/2012 | Woodard et al. | |
| 2016/0061618 A1 | 3/2016 | Benenson et al. | |
| 2016/0063862 A1 | 3/2016 | Rosen | |
| 2016/0107646 A1* | 4/2016 | Kolisetty | B60W 50/16 701/96 |
| 2016/0155276 A1 | 6/2016 | Ho et al. | |
| 2016/0155332 A1* | 6/2016 | Wang | G08G 1/096716 340/932.2 |
| 2017/0046955 A1 | 2/2017 | Shen et al. | |
| 2017/0098376 A1* | 4/2017 | Wang | G08G 1/017 707/707 |
| 2018/0053417 A1 | 2/2018 | Rolf et al. | |

FOREIGN PATENT DOCUMENTS

| | | |
|---|---|---|
| CN | 105526940 A | 4/2016 |
| CN | 105651296 A | 6/2016 |
| CN | 105987703 A | 10/2016 |
| CN | 106251695 A | 12/2016 |
| CN | 106297392 A | 1/2017 |
| CN | 106485943 A | 3/2017 |
| CN | 106652547 A | 5/2017 |
| CN | 106683485 A | 5/2017 |
| CN | 106710302 A | 5/2017 |
| CN | 106781669 A | 5/2017 |
| EP | 2953112 A1 | 12/2015 |
| JP | 2009092586 A | 4/2009 |
| JP | 2013007674 A | 1/2013 |
| JP | 2013019740 A | 1/2013 |
| JP | 5886671 B2 | 3/2016 |
| KR | 20110105124 A | 9/2011 |
| KR | 20140109547 A | 9/2014 |
| RU | 2516575 C2 | 5/2014 |
| RU | 2668361 C1 | 9/2018 |
| WO | 2010081545 A1 | 7/2010 |
| WO | 20120039867 A1 | 3/2012 |
| WO | 2017103157 A1 | 6/2017 |

\* cited by examiner

METHOD OF AND SERVER FOR GENERATING PARKING SUGGESTIONS TO BE DISPLAYED ON AN ELECTRONIC DEVICE

CROSS-REFERENCE

The present application claims priority to Russian Patent Application No. 2018145552, entitled "Method of and Server for Generating Parking Suggestions to be Displayed on an Electronic Device", filed Dec. 21, 2018, the entirety of which is incorporated herein by reference.

FIELD OF TECHNOLOGY

The present technology relates to map applications executable by an electronic device and, more specifically, to a method of and a server for generating parking suggestions for a given destination location in a map application executed by the electronic device.

BACKGROUND

Many electronic devices available to a user provide geo-location and routing information by means of executing a "map application".

Some of these electronic devices are dedicated to provision of the geo-location and routing information. An example of such devices would be a portable GPS navigator, such as those available from TomTom Corporation of Amsterdam, The Netherlands. Another example of such devices would be a GPS navigator, built-in into a car. For example, many car manufacturers provide an option to include a built-in navigation system into their cars.

Other electronic devices provide geo-location and route information as an add-on to other functions. For example, most smartphones available on the market today include an application that provides geo-location and routing services. Some of these map applications are "native" to the smartphone, i.e. is provided as part of the operating system or the set of pre-installed applications. Other of such map applications can be downloaded from application repositories (the so-called "app stores", such as APPLE™ STORE, or the like).

Most of these map applications allow a user to build a "route" from Point A (a starting location) to a Point B (a destination point). Depending on the exact implementation of the map application, the user is also provided with additional choices, such as selection of: a fastest route, a shortest route, a route that avoids highway, a route that avoids toll roads, etc. Once the user provides all the user selections, the map applications generates one or more suggested routes that would take the user from the Point A to the Point B, taking into account the user-selected preferences for the so-generated route.

As the user embarks on driving along the one of the one or more suggested routes, the map application typically displays progress of the user along the route (typically by showing a progression of the user along the route by means of a moving an arrow or another symbol representing the user's position along the suggested route). The map application can also provide the user additional information—such as: time remaining to the destination, any obstacles along the route (such as accidents or constructions sites), traffic information along the route, alternative suggested routes (typically, these are shown is a "less emphasized" manner, such as in a grey color or the like), and the like.

Once the user approaches the destination (i.e. the Point B), the user needs to find a parking spot to leave her vehicle. Depending on the location of the Point B (such as downtown vs suburbs, etc.), finding a parking spot may be a nuisance for the user. The user may waste significant amount of time finding the parking spot. Current implementations of the map application do very little to suggest to the user possible parking spots. The most common solution nowadays is the map application showing, on the displayed map, location of parking garages and the like.

United States Patent Application Publication No. 2016/0155276 A1 published on Dec. 1, 2014 to Institute for Information Industry and titled "Method and Apparatus of Dynamically Assigning Parking Lot" teaches a method for dynamically assigning a parking lot. First, one or a plurality of parking lots located in a set distance is selected according to a destination provided by the car. Next, a time of parking space to be available is estimated according a real-time parking data and a historical parking data of the one or the plurality of parking lots. Then, a waiting time is estimated according the time of parking space to be available and a car number in a line information of the one or the plurality of parking lots. A driving time of the car to the one or the plurality of parking lots according to a position of the car is estimated. Finally, a total waiting time is estimated according the driving time and the waiting time of the one or the plurality of parking lots.

U.S. Pat. No. 9,652,986 A1 granted on May 16, 2017 to Bayerische Motoren Werke AG and titled "Method for providing parking information on free parking spaces" teaches a method for providing parking information regarding free parking spaces within at least one city block. The method provides for detecting information regarding available, free parking spaces, wherein a knowledge database with historical data is generated from the detected information. The historical data for specified city blocks and/or specified times or periods of time respectively comprise statistical data regarding free parking spaces. From the historical data and current information that are detected by vehicles in traffic for a first given point in time for a single or a plurality of selected city blocks, a probability distribution of free parking spaces to be expected for the single or the plurality of city blocks is determined. A visualization of the probability distribution is generated that represents the parking information regarding free parking spaces within the single or the plurality of city blocks.

SUMMARY

Embodiments of the present technology have been developed based on developers' appreciation that it is desirable for the map application to generate parking suggestions as the user's vehicle approaches a final destination of the route generated by the map application.

More precisely, developer(s) have appreciated that user(s) may park their vehicles in locations which may not be referenced and/or known by map applications. Further, such locations may be unofficial, and be cheaper (or free), and more convenient to the user(s) than typically suggested locations.

Developer(s) have also appreciated that operators of map applications have access historical data of users having traveled to a given destination via routes generated by the map applications and such past user interaction data may be used to determine candidate parking locations.

Further, developer(s) have also recognized that some existing prior art methods do not consider hierarchy of objects on a map when providing parking suggestions, and may provide parking suggestions which may be sometimes inconvenient, expensive or may be always occupied.

The present technology is based on developer(s) acknowledgement that a minimum spanning tree (MST) algorithm could be modified to hierarchically cluster parking locations, such that parking locations could be provided as suggestion to users for a given destination more efficiently, by considering different features and constraints such as location, presence of obstructions, inaccessible places, parking price, and the like when forming a set of clusters.

Thus, embodiments of the present technology are directed to a method and a server for providing parking suggestions in the form of clusters for a given destination location by using a hierarchical clustering algorithm, the parking suggestions to be displayed on an electronic device.

In accordance with a first broad aspect of the present technology, there is provided a computer-implemented method for determining parking suggestions for a given destination location on a map, the parking suggestions being displayable on the map, the map being displayable on an electronic device. The method is executable by a server, the server is connectable to the electronic device and to a database, and the server executes a clustering algorithm. The method begins by acquiring, from the database, based on the given destination location, a set of past routes having been taken on the map by users associated with respective electronic devices, each respective past route of the set of past routes terminating at the given destination location. A set of final locations associated with the set of past routes is determined, each final location being an actual ending location of at least one respective user of a respective electronic device having taken the respective past route to the given destination location on the map, each final location being a candidate parking suggestion. A road graph of the map is acquired, the road graph including a set of map objects, each map object having: a respective object location, and a respective object class, the respective object class being indicative of a respective type of structure on the map. The set of final locations is clustered to obtain a set of clusters, each cluster including a respective subset of final locations, each cluster of at least a portion of the set of clusters being associated with at least one map object and the associated respective object location, the clustering being based on: the given destination location, the respective final locations, the respective object locations, and the respective classes of the respective map objects. A request for a current route to the given destination location is received from the client device, the request including an indication of a starting location, A current route on the map from the starting location to the given destination location is determined, and at least one cluster based on the given destination location, the at least one cluster including a respective subset of final locations as a parking suggestion for the given destination location is determined. The current route is transmitted to the electronic device, the current route including the parking suggestion.

In some embodiments of the method, the determining the set of final locations is based on a respective distance between each final location and the given destination location being below a predetermined threshold.

In some embodiments of the method the respective object class is indicative of a level of hierarchy of the respective map object on the road graph, and the clustering is executed in a hierarchical manner In some embodiments of the method each cluster has a respective centroid and a respective size, and the determining the at least one cluster including the respective subset of final locations as the parking suggestion is based on the respective centroid and the respective size of the at least one cluster.

In some embodiments of the method, the clustering is performed by using a heuristic evaluation function.

In some embodiments of the method, the clustering algorithm is based on Kruskal's algorithm.

In some embodiments of the method, the set of clusters has a predetermined number of clusters.

In some embodiments of the method each past route is associated with a respective period of time spent by the at least one user of the respective electronic device at the final location, and the determining the set of final locations is further based on the period of time being above a predetermined time threshold.

In some embodiments of the method, the method further comprises, prior to the clustering: associating, by the server, each final location of at least a portion of the set of final locations with at least one map object based on a respective distance between the final location and the at least one respective object location associated with each of the at least one map object.

In some embodiments of the method, the respective object class is one of: a road segment, a roadblock, and a known parking location.

In some embodiments of the method, the road segment class includes one of: a freeway, an arterial road, a collector road, and a local road.

In accordance with another broad aspect of the present technology, there is provided a server for determining parking suggestions for a given destination location on a map, the parking suggestions being displayable on the map, the map being displayable on an electronic device connected to the server, the server being connected to a database, the server comprising: a processor, a non-transitory computer-readable medium comprising instructions. The processor, upon executing the instructions, is configured to: acquire, from the database, based on the given destination location, a set of past routes having been taken on the map by users associated with respective electronic devices, each respective past route of the set of past routes terminating at the given destination location. The processor is configured to determine a set of final locations associated with the set of past routes, each final location being an actual ending location of at least one respective user of a respective electronic device having taken the respective past route to the given destination location on the map, each final location being a candidate parking suggestion. The processor is then configured to acquire, from the database, a road graph of the map, the road graph including a set of map objects, each map object having: a respective object location, and a respective object class, the respective object class being indicative of a respective type of structure on the map. The processor is configured to cluster the set of final locations to obtain a set of clusters, each cluster including a respective subset of final locations, each cluster f at least a portion of the set of clusters being associated with at least one map object and the associated respective object location, the clustering being based on: the given destination location, the respective final locations, the respective object locations, and the respective classes of the respective map objects. The processor is configured to receive, from the electronic device, a request for a current route to the given destination location, the request including an indication of a starting location. The processor is configured to determine a current route on the map from the starting location to the given destination location and at least one cluster including a respective subset of final locations as a parking suggestion for the given destination location, and transmit, to the client device, the current route, the current route including the parking suggestion.

In some embodiments of the server, the determining the set of final locations is based on a respective distance between each final location and the given destination location being below a predetermined threshold.

In some embodiments of the server, the respective object class is indicative of a level of hierarchy of the respective map object on the road graph and the clustering is executed in a hierarchical manner.

In some embodiments of the server, each cluster has a respective centroid and a respective size. The determining the at least one cluster including the respective subset of final locations as the parking suggestion is based on the respective centroid and the respective size of the at least one cluster.

In some embodiments of the server, the clustering is performed by using a heuristic evaluation function.

In some embodiments of the server, the clustering algorithm is based on Kruskal's algorithm.

In some embodiments of the server, the set of clusters has a predetermined number of clusters.

In some embodiments of the server, each past route is associated with a respective period of time spent by the at least one user of the respective electronic device at the final location. The determining the set of final locations is further based on the period of time being above a predetermined time threshold.

In some embodiments of the server, the processor is further configured to, prior to the clustering: associate each final location of at least a portion of the set of final locations with at least one map object based on a respective distance between the final location and the at least one respective object location associated with each of the at least one map object, In some embodiments of the server, the respective object class is one of: a road segment, a roadblock, and a known parking location.

In some embodiments of the server, the road segment class includes one of: a freeway, an arterial road, a collector road, and a local road. In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
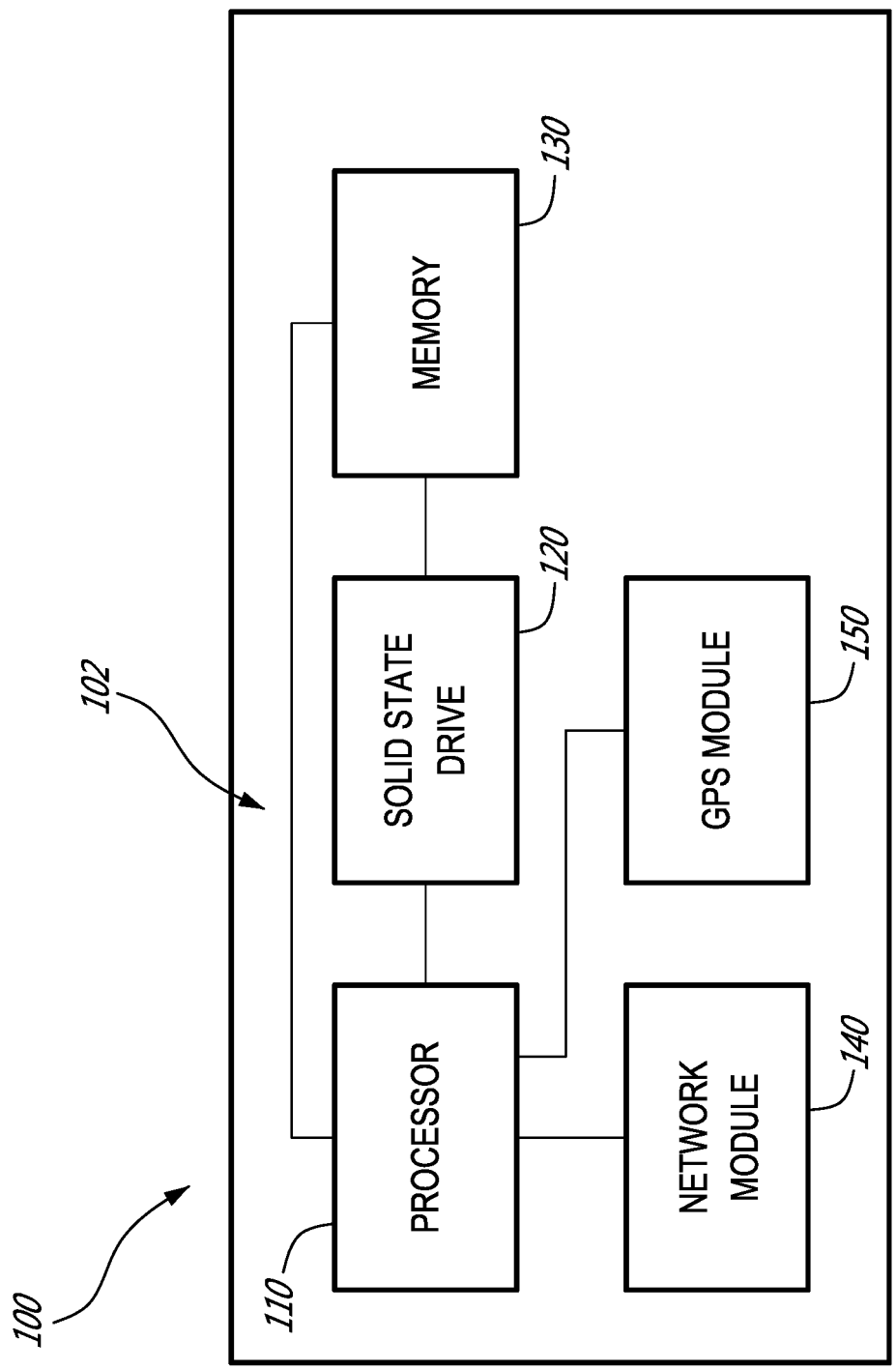
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

System Description

With reference to FIG. 1, there is shown a computer system 100 suitable for use with some implementations of the present technology, the computer system 100 comprising various hardware components including one or more single or multi-core processors collectively represented by a processor 110, a solid-state drive 120, a memory 130, which may be a random-access memory, a network module 140, and a GPS module 150. Communication between the various components of the computer system 100 may be enabled by one or more internal and/or external buses (generally depicted at 102), e.g. a PCI bus, universal serial bus, IEEE 1394 "Firewire" bus, SCSI bus, Serial-ATA bus, etc., to which the various hardware components are electronically coupled. In the non-limiting embodiment depicted in FIG. 1, the communication within the computer system 100 is implemented in a "hub and spoke" manner via the processor 110; however, in alternative implementations of the present technology, the communication can be implemented differently.

According to embodiments of the present technology, the solid-state drive 120 stores program instructions suitable for being loaded into the memory 130 and executed by the processor 110 for displaying information to a user of the computer system 100 as will be described in further detail below. For example, the program instructions may be part of a map or navigational application executable by the processor 110. The network module 140 and the GPS module 150 allow communication between different computer systems, servers and/or other devices.

Figure 2:
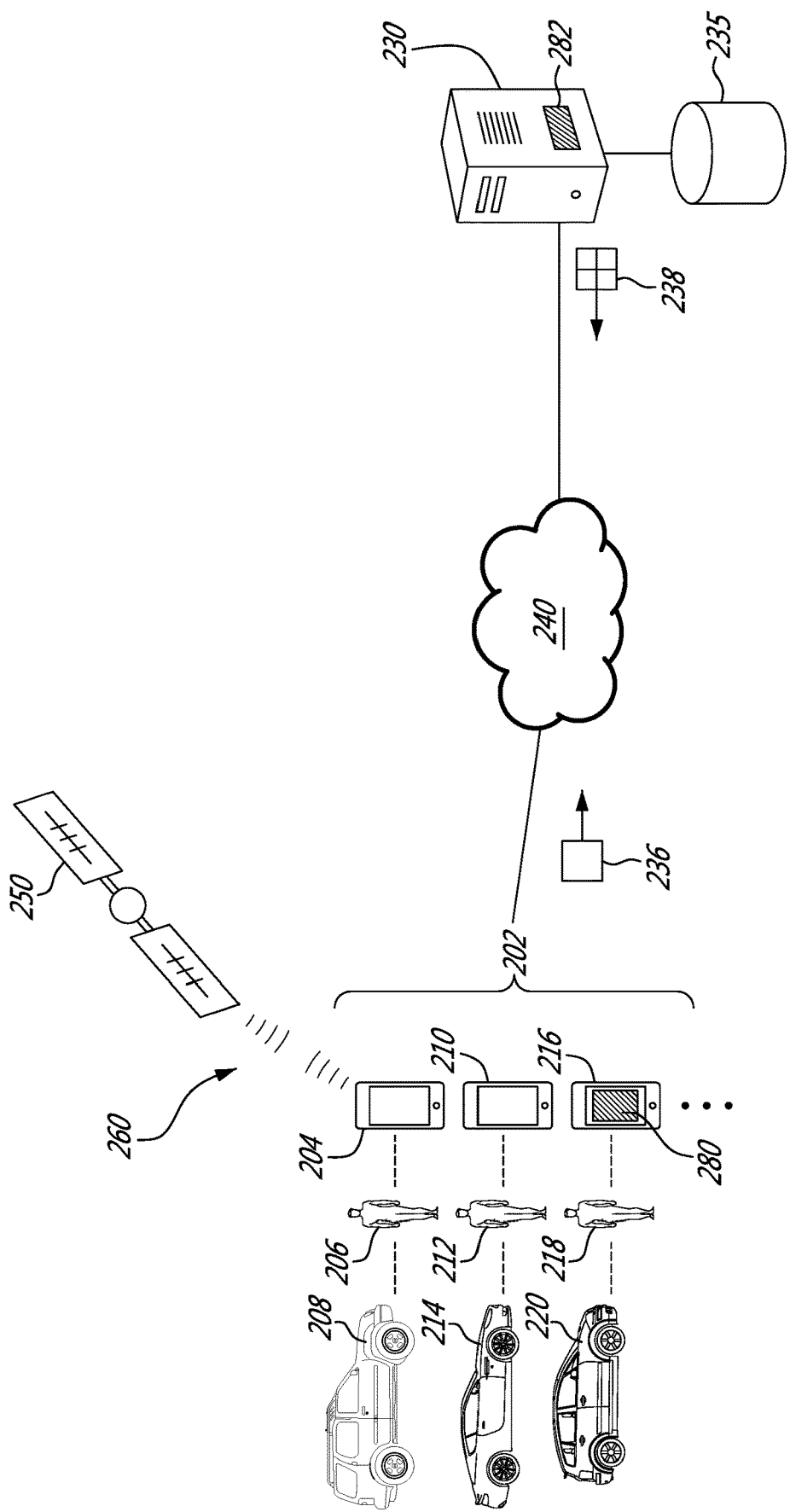
FIG. 2 depicts a schematic diagram networked computing environment being suitable for use in accordance with non-limiting embodiments of the present technology.

FIG. 2 illustrates a networked computing environment 200 suitable for use with some embodiments of the systems and/or methods of the present technology. The networked computing environment 200 comprises a plurality of electronic devices 202. The plurality of electronic devices 202 comprises a first electronic device 204, a second electronic device 210, and a third electronic device 216 respectively associated with a first user 206, a second user 212, and a third user 218. The first user 206 operates a first vehicle 208, the second user 212 operates a second vehicle 214, and the third user 218 operates a third vehicle 220.

It should be noted that although the plurality of electronic devices 202 was depicted as comprising three distinct electronic devices, this may not and does not need to be the case in each and every implementation of the present technology. In fact, the plurality of electronic devices 202 could number in the tens or hundreds of thousands.

The networked computing environment 200 also comprises a server 230 in communication with the plurality of electronic devices 202 via a communications network 240. The networked computing environment 200 further comprises a GPS satellite 250 transmitting and/or receiving a GPS signal 260 to/from the plurality of electronic devices 202. It will be understood that the present technology is not limited to GPS and may employ a positioning technology other than GPS (such as, GLONASS, DORIS, BeiDou, COMPASS, for example).

In some embodiments of the present technology, the communications network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link (not separately numbered) between a given electronic device and the communications network 240 is implemented will depend inter alia on how the given electronic device is implemented.

In some embodiments of the present technology, the server 230 is implemented as a conventional computer server. In one non-limiting example, the server 230 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 230 may be distributed and may be implemented via multiple servers.

The implementation of a given electronic device from the plurality of electronic devices 202 is not particularly limited, but as an example, the given electronic device may be implemented as a wireless communication device such as a mobile telephone (e.g. a smart phone or a radio-phone), a vehicle navigation device (e.g. TomTom™, Garmin™), a tablet, a personal computer and the like. However in FIG. 2, each given electronic device is depicted as the smart phone (although, they do not need to be implemented the same and a given one of the electronic devices may be implemented from another one of the electronic devices). Further, in some embodiments of the present technology, a given electronic device may be integrated to a vehicle in the form an onboard media computer (MCU).

The given electronic device may comprise some or all of the components of the computer system 100 depicted in FIG. 1. In some embodiments, the given electronic device comprises the network module 140 for communicating with the server 230 via the communications network 240, the GPS module 150 for receiving and transmitting the GPS signal 260 to the GPS satellite 250 (i.e., for enabling GPS capabilities of the given electronic device), the processor 110, the memory 130, and a display interface such as a touch-screen for example. The given electronic device comprises hardware and/or software and/or firmware, or a combination thereof, for executing a map application, only one instance of which is depicted in FIG. 1 at 280 in association with the third electronic device 216. In some embodiments of the present technology, the given electronic device may be configured to augment the GPS information using wireless-network mapping techniques that determine a geographic location based on the presence of certain wireless networks proximate to the user device (e.g., Wi-Fi mapping).

In a specific non-limiting embodiment of the present technology, the map application 280 may be implemented as Yandex.Maps™ or Yandex.Navigator™ applications made available by Yandex®.

The map application 280 is configured for a two-way communication with the server 230. The server 230 is configured to execute a server-side map application 282. The map application 280 and the server-side map application 282 are configured for delivering to the user (such as the third user 218) map and route information. In some embodiments of the present technology, the map application 280 is configured to generate and to send to the server 230 a map request 236, the map request 236 containing information about map information requested by the third user 218 (such as an address for depicting a particular point of interest or routing information for generating a route). The map request 236 can be generated in response to the third user 218 interacting with the map application 280 (such as entering the requested info, etc.). In response to the receipt of the map request 236, the server 230 can generate and transmit to the map application 280 a map information packet 238, the map information packet 238 containing data required for the map application 280 to generate and display a map view that is responsive to the information requested by the third user 218 and transmitted as part of the map request 236.

In alternative embodiments of the present technology, the map application 280 can store locally (i.e. on the third electronic device 216) some map information for so-called offline browsing (i.e. generation of map information without having to send the map request 236 and/or to receive the map information packet 238). In other words and broadly speaking, the map application 280 can render the map application based on information received from the server 230 either in real time or in an offline manner.

Figure 3:
FIG. 3 depicts a set of past routes taken by users to a destination location on a map section in accordance with non-limiting embodiments of the present technology.

With reference to FIG. 3, there is depicted a schematic diagram of a map section 300 including a set of past routes 310, the set of past routes 310 having been taken by a plurality of users (such as the first user 206, the second user 212 and the third user 218) to a destination location 312 in accordance with non-limiting embodiments of the present technology.

It should be noted that the server-side map application 282 does not necessarily have a graphical user interface (GUI) and the set of past routes 310 are depicted on the map section 300 for purpose of illustration and ease of understanding.

Set of Past Routes

The server 230 retrieves, from the database 235, based on a the destination location 312, a set of past routes 310, the set of past routes 310 having been taken by plurality of users (such as the first user 206, the second user 212, and the third user 218) associated with the plurality of electronic devices 202 from respective starting locations 308 to the destination location 312. Each past route 314 of the set of past routes 310 is a respective past route having been requested by a respective user via the map application 280 on the respective electronic device (e.g. the second electronic device 210). The server-side map application 282 of the server 230 may have transmitted the map information packet 238 and caused to display, on the map application 280 of each respective electronic device (e.g. the second electronic device 210), a respective past route 314 to the destination location 312, based on the respective starting location 308 of the respective electronic device (e.g. the second electronic device 210). Each respective user may haven then taken the respective past route 314 from the respective starting location 308 to the destination location 312 with his or her respective vehicle.

The set of past routes 310 may be retrieved for a specific period in time (such as from Monday to Friday between 8 AM and 5 PM for the period of January to August for example), or may be retrieved for a complete period (such as all past routes to the destination location 312 from January to December). A number of past routes in the set of past routes 310 is not limited, and may be in the hundreds, thousands, or more. In some embodiments of the present technology, the server 230 may only retrieve the set of past routes 310 based on the destination location 312 only if the number of past routes in the set of past routes 310 is over a predetermined threshold (such as at least 2000 past routes, for example).

The nature of the destination location 312 is not limited. The destination location 312 may be a point of interest (POI) having been selected or input on the map application 280 of plurality of electronic devices 202 such as a residence building, a business, a hospital, a park, and the like. In other embodiments of the present technology, the destination location 312 may have been input by providing an address or geo-location coordinates in the server-side map application 282. In alternative embodiments of the present technology, the destination location 312 may be a private (single family or the like) house or a private land.

Each respective past route 314 of the set of past routes 310 may also include respective intermediate locations 316, the respective intermediate locations 316 being points along the respective past route 314 taken by the respective electronic device (e.g. the second electronic device 210) of each user to arrive to the destination location 312 via their respective vehicles (e.g. the first vehicle 208). The respective starting locations 308, the destination location 312, the respective intermediate locations 316 may all be associated with respective timestamps indicating at what time the respective user was at the respective location.

Set of Final Locations

The server-side map application 282 determines, for each past route 314 of the set of past routes 310, a respective final location 324 to obtain a set of final locations 320. The respective final location 324 is indicative of an actual ending location of the respective user (e.g. the second user 212) of the respective electronic device (e.g. the third electronic device 216) having taken the past route 314 with his or her respective vehicle (e.g. the second vehicle 214). As it may be understood, a user (e.g. second user 212) intending to reach the destination location 312 via the respective past route 314 aboard its respective vehicle (e.g. the second vehicle 214) may need to park the vehicle near the destination location 312, and usually stops/parks his or her vehicle at a respective final location 324 located at a walking distance from the destination location 312.

How the server-side map application 282 determines the respective final location 324 is not limited.

In some embodiments of the present technology, the server-side map application 282 may determine the respective final location 324 based on a predetermined time threshold at and/or predetermined distance threshold from the destination location 312, e.g. if the respective electronic device (e.g. the third electronic device 216) of the user (e.g. the second user 212) has been at a location within a threshold of 500 meters of the destination location for more than 4 minutes, the server-side map application 28 may consider the location as the respective final location 324. The predetermined time threshold may be chosen to ensure that the second user 212 hasn't stopped his or her second vehicle 214 only temporarily at the respective final location 324, as an example at a traffic light. Additionally or alternatively, to determine that a location is a final location 324, a number users associated with past routes having stopped at the location may need to be over a predetermined threshold e.g. at least 10 users having taken respective past routes to the destination location 312 may need to have stopped at the location for the location to be considered a respective final location 324 for the destination location 312.

In other embodiments of the present technology, the map application 280 of the third electronic device 216 may transmit an indication of a location to the server-side map application 282, as an example when the second user 212 closes the map application 280 on the third electronic device 216 and/or switches to another application (not depicted) on the third electronic device 216, which may indicate that the user (e.g. second user 212) has finished driving his second vehicle 214 to the destination location 312 and causes transmission of the map request 236. Additionally or alternatively, the user (e.g. second user 212) may indicate on the map application 280 that he or she has finished driving, which causes the map application 280 to send the last location to the server-side map application 282. The respective final location 324 may thus be located before the destination location 312 on the respective past route 314 (such as at a respective intermediate location of the set of intermediate locations 316 on the respective past route 314 for example), after the destination location 312 on the respective past route 314 (i.e. past the destination location 312 in directions opposite to the respective past route 314), or may be located directly at the destination location.

Generally speaking, the respective final location 324 is an "unofficial" parking location i.e. the respective final location 324 is not present in the database 235 of the server 230 as a parking location. However, this does not need to be so in every embodiment of the present technology, and official parking locations such as paid city or private parking locations for example may be considered as respective final locations. As a non-limiting example, the respective final location 324 may be a parking place in a street, in a parking lot, in a parking building, an exterior parking space of a building, a house, an abandoned terrain, in a field, in a building garage, and the like.

Figure 4:
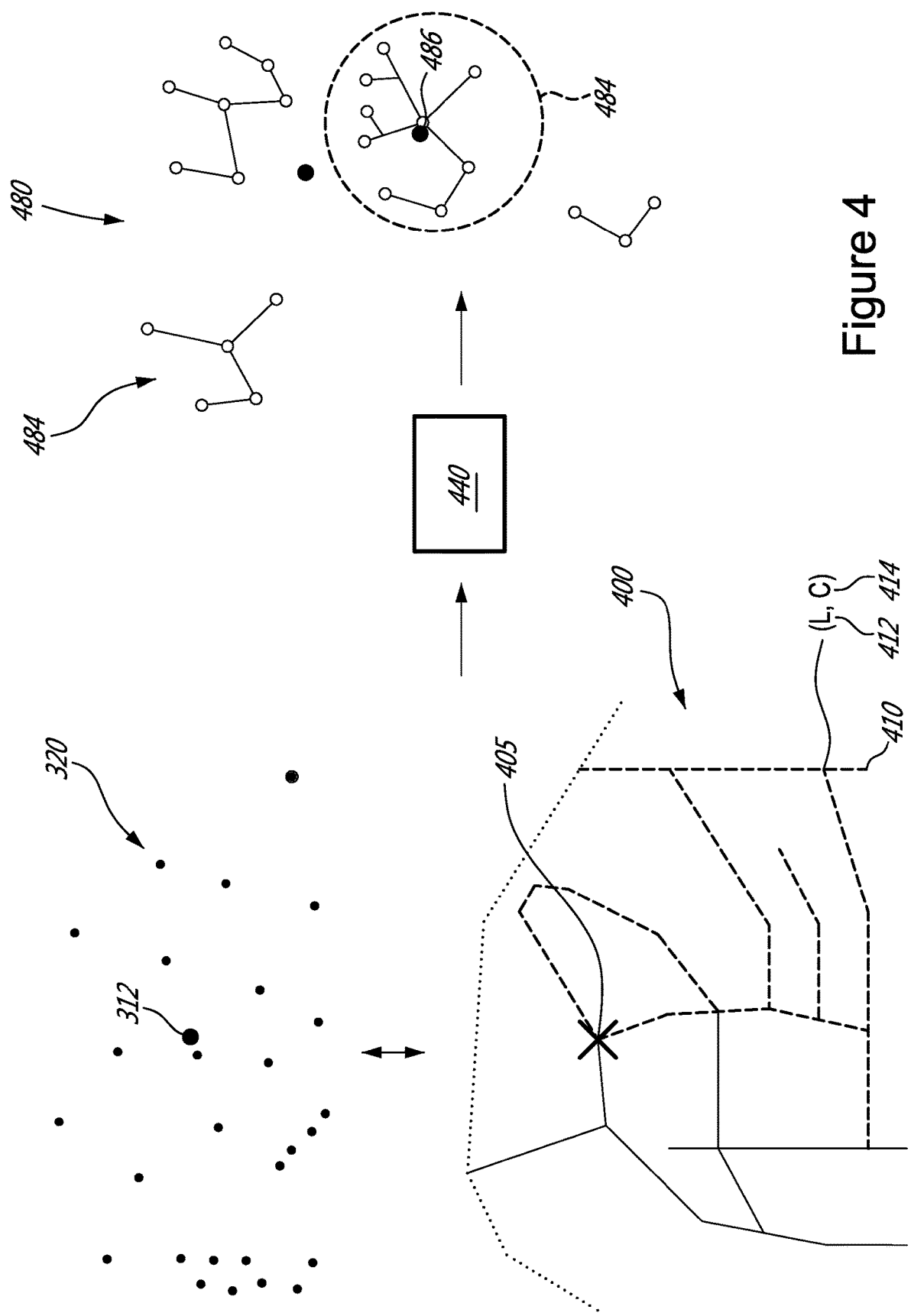
FIG. 4 depicts a schematic diagram of a clustering procedure 400 in accordance with non-limiting embodiments of the present technology.

Now turning to FIG. 4, there is depicted a schematic diagram of a clustering procedure 400 in accordance with non-limiting embodiments of the present technology.

Depicted in FIG. 4, as actors in the clustering procedure 400, are: the set of final locations 320, a road graph 402, a clustering algorithm 440 and a set of clusters 480

Road Graph

Before, during, or after acquisition of the set of past routes 310, the server 230 acquires, from the database 235, based on the destination location 312, a road graph 402 corresponding to the map section 300.

It should be noted that in alternative embodiments of the present technology, the road graph 402 may correspond to an area surrounding the destination location 312 (e.g. a 10 km² area around the destination location 312), or may correspond to the entire map of the city or region.

Generally speaking, the road graph 402 is a graph representation of the map section 300, where all paths that could be taken by motorized vehicles (and/or pedestrians) to the destination location 312 are represented in a form of edges and vertices.

In the embodiment illustrated herein, the road graph 402 includes a set of map objects 405, each map object 410 being a respective vertex on the road graph 402, each map object 410 having a respective object class 414 and at least one respective object location 412.

The respective object class 414 of a respective map object 410 is indicative of a type of structure of the respective map object 410 on the map section 300 and/or features of the respective map object 410. Generally speaking, the type of structure is a structure on the map section 300 adapted to receive a motorized vehicle.

In some embodiments of the present technology, a respective map object may have one or more object classes. Additionally or alternatively, the respective map object 410 may also have one or more sub-classes for each of the object classes 414.

As a non-limiting example, the respective object class 414 of the respective map object may be a road segment. The respective map object having the road segment class is indicative that the respective map object is a portion of a given road on the map section 300. Thus, one or more map objects having the road segment class may form a road.

It is contemplated that in some embodiments of the present technology, the respective map object 410 having the road segment class may also have as a class or as a subclass that is indicative of a respective type of road of the respective road segment, such as a highway freeway/dual carriageway, an arterial road, a collector road, and a local road for example. Additionally or alternatively, the respective map object having the road segment class may also have as a class or as a subclass that is indicative if the road segment class is a way, a street, an avenue, a boulevard, a lane, a drive, a terrace, a place and a court.

In other embodiments of the present technology, the respective map object 410 having the road segment class may also have one or more additional class or sub-classes which may based on: efficiency of travel, access points, speed limit, popular times of occupation route spacing, traffic usage, price, and the like.

As a non-limiting example, the respective object class 414 of the respective map object may be a road block. The road block class is indicative of an obstruction on a given road, which may be temporary or permanent, and may prevent a motorized vehicle from travelling on the given road. The respective map object having the road block class may have one or more other classes or sub-classes indicative if the road block is a construction site, a presence of debris, a dead end, a security barrier, a no entry sign, a private or forbidden road, and the like.

As a non-limiting example, the respective object class 414 of the respective map object may be an official parking. The official parking class may be generally a city parking or a private parking associated with a price, which has been provided to the server-side map application 282. The parking class may have one or more additional classes or sub-classes which may indicate if it is in a parking facility, if it is a city parking or private parking, a price associated with the parking, a parking pattern (parallel, perpendicular, angle parking or other), parking size, and the like.

The respective map object 410 has at least one respective object location 412, which indicates as an example at least one of starting location of the respective map object 410, an end location of the respective map object 410, and/or intermediate locations between the starting and end location of the respective map object 410.

Thus, it may be said that the road graph 402 allows representing a road network surrounding the destination location 312 via the set of map objects 405, where each map object 410 is associated with one or more respective object classes.

It should be understood that the nature of the respective object class 414 of each map object is not limited, and may be determined by the developer(s) based as an example on past user interaction data, and official data from the city, region, or country, and the respective classes listed herein above may change depending on the continent, country, region, city or neighbourhood.

The server-side map application 282 associates the set of final locations 320 with the road graph 402.

Generally speaking, the server-side map application 282 associates each final location 324 of the set of final locations 320 with a respective map object 410 and its respective object class 414 on the road graph 402 based on the at least one object location 412 associated with the respective map object 410. The server-side map application 282 may associate the final location 324 with the respective map object 410 and the respective object class 414 based on a distance between the final location 324 and the at least one respective object location 412 being below a predetermined distance threshold. In some embodiments of the present technology, at least one final location (not depicted) of the set of final locations 320 may not be associated with a map object 410 of the road graph 402, as an example if the object location 412 is above the predetermined distance threshold and/or there is no map object 410.

The set of final locations 320 are thus represented as additional nodes on the road graph 402, where each final location 324 of at least a portion of the set of final locations 320 is associated with a respective map object 410 and a respective object class 414 via its association with the respective map object 410.

The server-side map application 282 is configured to execute clustering of the set of final locations 320 associated with the road graph 402 via a clustering algorithm 440.

Clustering

The server-side map application 282 executes the clustering algorithm 440. In some non-limiting embodiments of the present technology, the clustering algorithm 440 can be based on Kruskal's algorithm, although, use of other suitable algorithms is envisioned in other non-limiting embodiments of the present technology.

Briefly speaking, Kruskal's algorithm is a minimum spanning tree (MST) algorithm which finds an edge of the least possible weight that connects any two trees in a forest. A MST is a subset of the edges of a connected, edge-weighted undirected graph connecting all the vertices together, without any cycles and with the minimum possible total edge weight. Kruskal's algorithm is a greedy algorithm which finds a MST for a connected weighted graph adding increasing cost arcs at each step. In other words, given a connected and undirected graph, a spanning tree of the graph is a subgraph that is a tree and connects all vertices, and a MST or minimum weight spanning tree for a weighted, connected and undirected graph is a spanning tree with weight less than or equal to the weight of every other spanning tree.

Kruskal's algorithm is generally used for network design, as an approximation algorithm for NP-hard problems such as the travelling salesman problem (TSP) and Steiner Tree, and other indirect applications. In the context of the present technology, Kruskal's algorithm has been modified to execute clustering of the set of final locations 320 by implementing an evaluation function when executing the MST algorithm, which allows hierarchical clustering of the set of final locations 320. The evaluation function may be a heuristic function.

In some embodiments of the present technology, the evaluation function may be applied at every iteration by the clustering algorithm 440, and penalize some features (i.e. such a distance, or object class) by increasing the weighted distance between a pair of final locations sharing the features.

The evaluation function may also consider an area size covered by the cluster, a size of the cluster (i.e. number of final locations in the cluster), object classes of nearby objects not associated with final locations, and the like. The evaluation function considers hierarchy levels of the object classes and/or sub-classes.

The weighted distance between a pair of final locations is based on: the respective distances between the final locations 324 and the destination location 312, a distance between the final locations of the pair, and the respective object classes 414 associated with each of the final locations 324.

Thus, it may be said that the set of final locations 320 can be divided into a number of clusters such that a minimum weight between items in different clusters is maximized. The clustering is executed in a hierarchical manner, where initially, each final location 324 of the set of final locations 320 is considered as a separate cluster in and of itself, and the clustering algorithm 440 starts by applying the evaluation function and connecting the two final locations having a minimal weighted distance, then repeats the same with the next final location having a minimal distance, etc. The clustering stops when only one cluster is left, and selects the one on which the evaluation function is optimal (e.g. minimal or maximal) from all of the intermediate options.

It is contemplated that in some embodiments of the present technology, a number of clusters may be predetermined, and clustering may end when the predetermined number of clusters is reached.

The clustering algorithm 440 obtains a set of clusters 480, each cluster 484 having a respective size 486 and a respective centroid 488, each cluster 484 having a subset of final locations 320. Each cluster 484 of at least a portion of the set of clusters 480 may be associated with a respective map object 410 and a respective object location 412. Remaining clusters of the set of clusters 480 may not be associated with a respective map object 410, and be associated with a given area of the map section 300 or a final location of the subset of final location 320.

The respective centroid 488 may be an average of the distances of the final locations included in the respective cluster 484, and may be used to suggest the respective cluster 484 to a user depending on the direction he or she comes from. In other words, the location of the respective centroid 488 can be used as a visual proxy for representing the associated respective cluster 484. In some embodiments of the present technology, the respective centroid 488 may be used to suggest the respective cluster 484 as a parking suggestion based on a distance between the respective centroid 488 and intermediate points of the route of the user (not depicted) for example. The respective size 486 of the may also be used to suggest parking locations as the bigger the size of the associated parking location, the greater the probability of having unoccupied parking locations.

Figure 5:
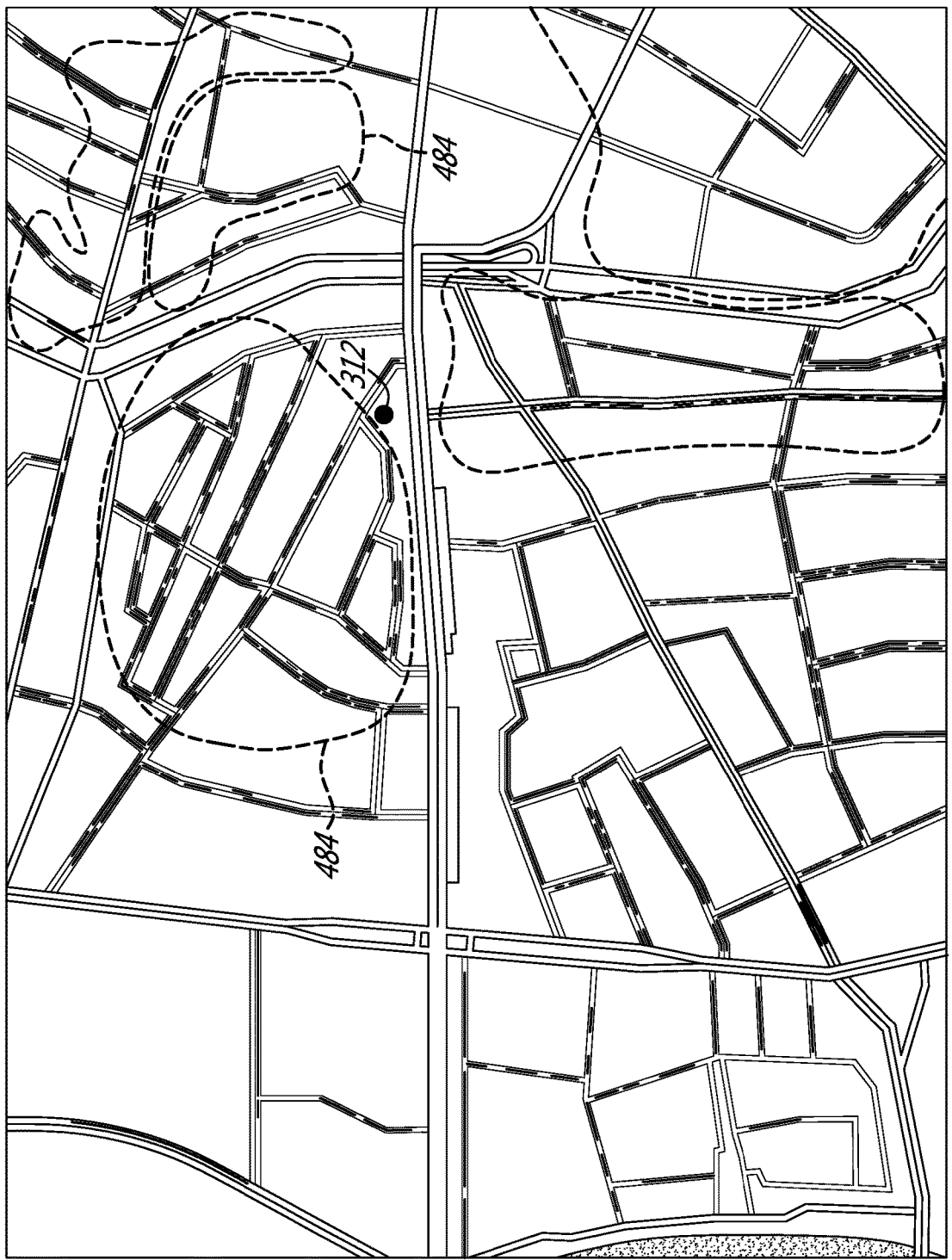
FIG. 5 depicts a map section with a set of clusters as parking suggestions in accordance with non-limiting embodiments of the present technology.

FIG. 5 depicts the map section 300 with a set of clusters 480 as parking suggestions, the set of clusters 480 having been obtained by executing the clustering algorithm 440 for the destination location 312 in accordance with non-limiting embodiments of the present technology.

As a non-limiting example, two groups of final locations may be at a short distance from each other, but separated by a two-way road (which may be, as a non-limiting example, an ensemble of map objects having in common the road segment class, the road class, a two-way class, a traffic class). Some prior art methods may cluster the two groups of final locations together because of the short distance separating them, but in the present embodiment, the two groups would not be clustered together as they would be penalized by the two-way road separating them, which may prevent easy access to a parking location from one side to the other.

One of the plurality of users, such as the first user 106, located at a given starting location in his or her first vehicle 208 may select or input the destination location 312 in the map application 280 on the first electronic device 204, which causes the map application 280 to transmit the map request 236 to the server 230, the map request 236 including a request for a route from the given starting location to the destination location 312. The server-side map application 282 may generate a current route from the given starting location to the destination location 312.

In other embodiments of the present technology, the first user 106 may only be interested in the destination location 312 and surrounding areas, and may zoom on a map section including the destination location 312 or select an interface element to display parking suggestions, which may cause the first electronic device 204 to transmit a request for parking suggestions surrounding the destination location 312.

The server-side map application 282 retrieves, from the database 235, the set of clusters 480 associated with the destination location 312, at least one cluster of the set of clusters 480 to be provided as a parking suggestion for the destination location 312. In embodiments where the first user 106 has requested a current route to the destination location 312, the server-side map application 282 may, based on the current route, suggest at least one cluster from the set of clusters 480 associated with the destination location 312 as parking suggestions. In some embodiments of the present technology, at least one cluster of the set of cluster 480 may be chosen first, and a current route to the destination location 312 may be suggested based on the selected at least one cluster. In other embodiments, the at least one cluster from the set of clusters 480 may be suggested based on a current location of the first user 302. Further, it is contemplated that the at least one cluster may be suggested based on explicit user preferences (i.e. specified by the first user 306 in the map application 280) or implicit user preferences (i.e. based on past user interaction data of the user), such as free parking, extra parking space, no street parking, and the like. In alternative embodiments, the set of clusters 480 as a whole may be suggested to the first user 106. The server-side map application 282 transmits the current route including the at least one cluster from the set of clusters 480 as parking suggestions. It is contemplated that if the first user 306 changes his or her route to the destination location 312, the server-side map application 282 may receive an indication from the map application 280, and regenerate a second current route and/or provide another cluster of the set of cluster 480 as parking suggestions.

The Method Description

Figure 6:
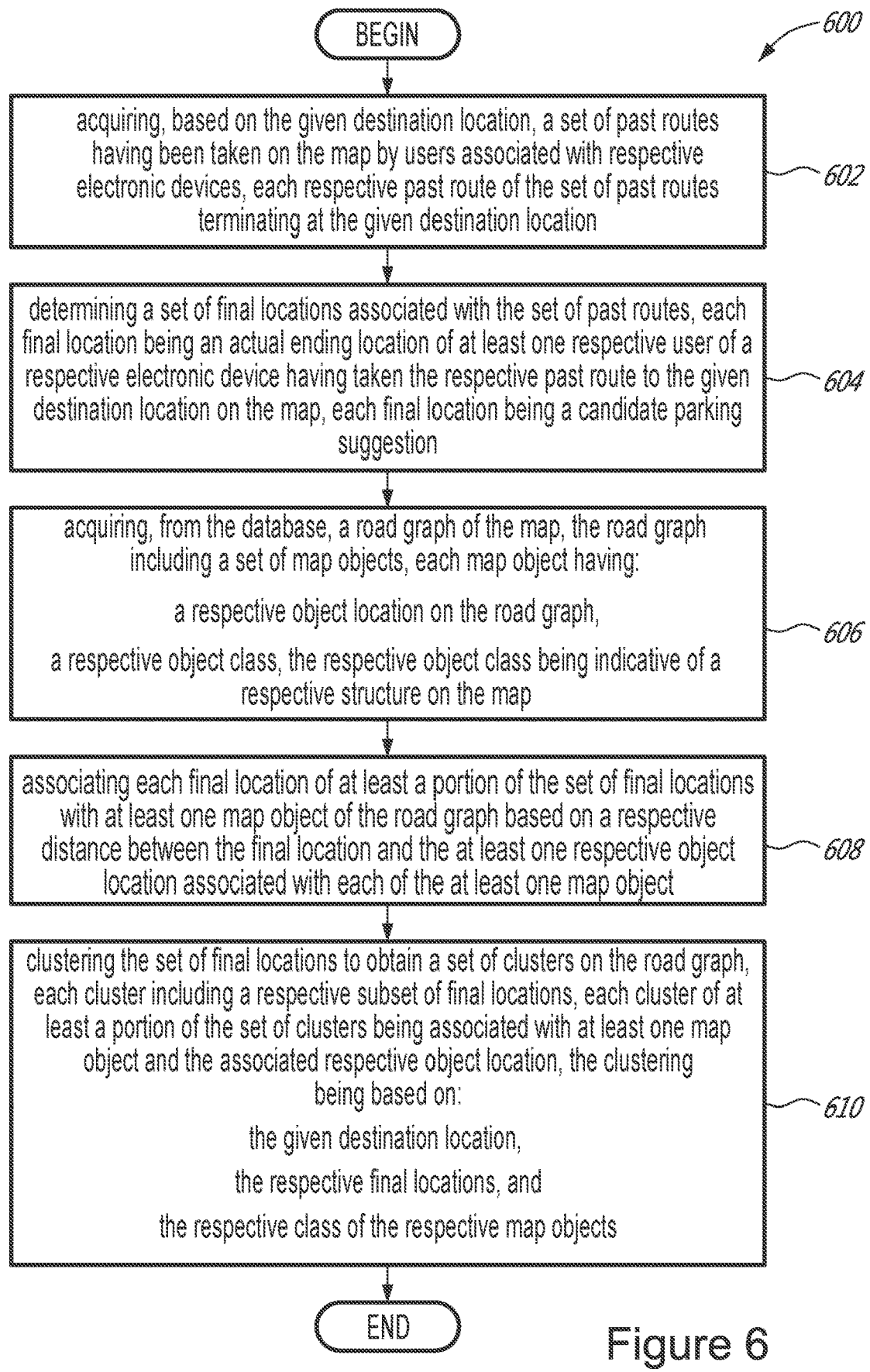
FIG. 6 depicts a flow chart of a method for determining parking suggestions for a given destination location in accordance with non-limiting embodiments of the present technology.

With reference to FIG. 6, there is depicted a flow chart of a method 600 for determining parking suggestions for a given destination location, the method 600 executable by the server 230 in accordance with non-limiting embodiments of the present technology.

The method 600 may begin at step 602.

STEP 602: acquiring, based on the given destination location, a set of past routes having been taken on the map by users associated with respective electronic devices, each respective past route of the set of past routes terminating at the given destination location At step 602, the server-side map application 282 of the server 230 acquires from the database 235, based on the destination location 312, a set of past routes 310 having been taken on the map section 300 by the plurality of users (i.e. the first user 206, the second user 212, and the third user 218) associated with respective electronic devices (such as the first electronic device 204, the second electronic device 210, and the third electronic device 216), each respective past route of the set of past routes 310 terminating at the destination location 312.

The method 600 then advances to step 604.

STEP 604: determining a set of final locations associated with the set of past routes, each final location being an actual ending location of at least one respective user of a respective electronic device having taken the respective past route to the given destination location on the map, each final location being a candidate parking suggestion At step 604, the server-side map application 282 of the server 230 determines a set of final locations 320 associated with the set of past routes 310, each final location being an actual ending location of at least one respective user of a respective electronic device having taken the respective past route 314 to the destination location 312 on the map section 300, each final location 324 being a candidate parking suggestion.

The method 600 then advances to step 606.

STEP 606: acquiring, from the database, a road graph of the map, the road graph including a set of map objects, each map object having:
  a respective object location on the road graph,
  a respective object class, the respective object class being indicative of a respective structure on the map At step 608, the server-side map application 282 of the server 230 acquires, from the database 235, a road graph 402 of the map section 300, the road graph 402 including a set of map objects 405, each map object having: a respective object location 412, and a respective object class 414, the respective object class 414 being indicative of a respective structure on the map section 300. In some embodiments of the present technology, the respective object class 414 may be one of a road segment, a roadblock, and a known parking location. In some embodiments of the present technology, the road segment class includes one of: a freeway, an arterial road, a collector road, and a local road.

The method 600 then advances to step 608.

STEP 608: associating each final location of at least a portion of the set of final locations with at least one map object of the road graph based on a respective distance between the final location and the at least one respective object location associated with each of the at least one map object At step 608, the server-side map application 282 of the server 230 associates each final location 324 of at least a portion the set of final locations 320 with at least one map object 410 of the road graph 402 based on a respective distance between the final location 324 and the at least one respective object location 412 associated with each of the at least one map object 410 being below a predetermined distance.

In some embodiments of the present technology, at least one given final location (not depicted) of the set of final locations 320 may not be associated with a map object 410 of the road graph 402, as an example if there is no map object 410 below the predetermined distance, or due to insufficient data.

The method 600 then advances to step 610.

STEP 610: clustering the set of final locations to obtain a set of clusters on the road graph, each cluster including a respective subset of final locations, each cluster of at least a portion of the set of clusters being associated with at least one map object and the associated respective object location, the clustering being based on:
  the given destination location,
  the respective final locations, and
  the respective class of the respective map objects.

At step 610, the server-side map application 282 of the server 230 executes the clustering algorithm 440 to cluster the set of final locations 320 into a set of clusters 480, each respective cluster 484 including a subset of the set of final locations 320.

The clustering is based on: the given destination location 312, the respective final locations 324, the respective object class 414 of the respective map objects 410, and the respective object location 412.

In some embodiments of the present technology, each respective cluster 484 of at least a portion of the set of clusters 480 may be associated with the respective map object 410 and its respective object class 414, and at least remaining cluster (not depicted) of the set of clusters 480 may not necessarily be associated with an object of the set of map objects 405, as an example if data about the map section 300 is insufficient, and may be "pinned" to a region of the map section 300 or a given location of the set of final locations 320.

In some embodiments of the present technology, a number of clusters in the set of clusters 480 may be predetermined. In some embodiments of the present technology, the clustering algorithm 440 may be based on a modified version of Kruskal's algorithm and use an evaluation function at each iterative step. In some embodiments of the present technology, the clustering algorithm 440 may use a heuristic evaluation function. The clustering algorithm 440 may perform the clustering in a hierarchical manner, where initially each final location 324 is considered as a respective cluster. Each respective cluster 484 has a respective size 486 and a respective centroid 488, which may be used to determine at least one of the respective cluster 484 as parking suggestions for the destination location 312.

The method 600 then ends.

The method 600 may then be repeated for a set of destination locations (not depicted) to obtain respective set of clusters (not depicted) to be provided as parking suggestions for each respective destination location in the set of destination locations. How the destination locations in the set of destination are selected is not limited, and the selection may be based on a popularity of the destination location for example.

The server-side map application 282 of the server 230 may store, in the database 235, each respective set of clusters for each destination location, at least one cluster of the respective set of clusters to be used as a parking suggestion for the respective destination location in the set of destination locations 312.

At least one cluster of a respective set of clusters may be provided by the server-side map application 282 to the map application 280 as a parking suggestion for a respective destination location. As a non-limiting example, a user zooming on a map section having the respective destination location and having activated beforehand an option to display parking suggestions, or a user selecting an interface element to display parking suggestions for the respective destination location, may cause the map application 280 to send the map request 236 to the server-side map application 282. The server-side map application 282 may retrieve at least one cluster from respective set of clusters from the database 235 and cause to display, on the map application 280, the at least one cluster as parking suggestions for the respective destination location. The at least one cluster of the respective set of clusters may also be provided as parking suggestions to a user requesting a route to the respective destination location.

Figure 7:
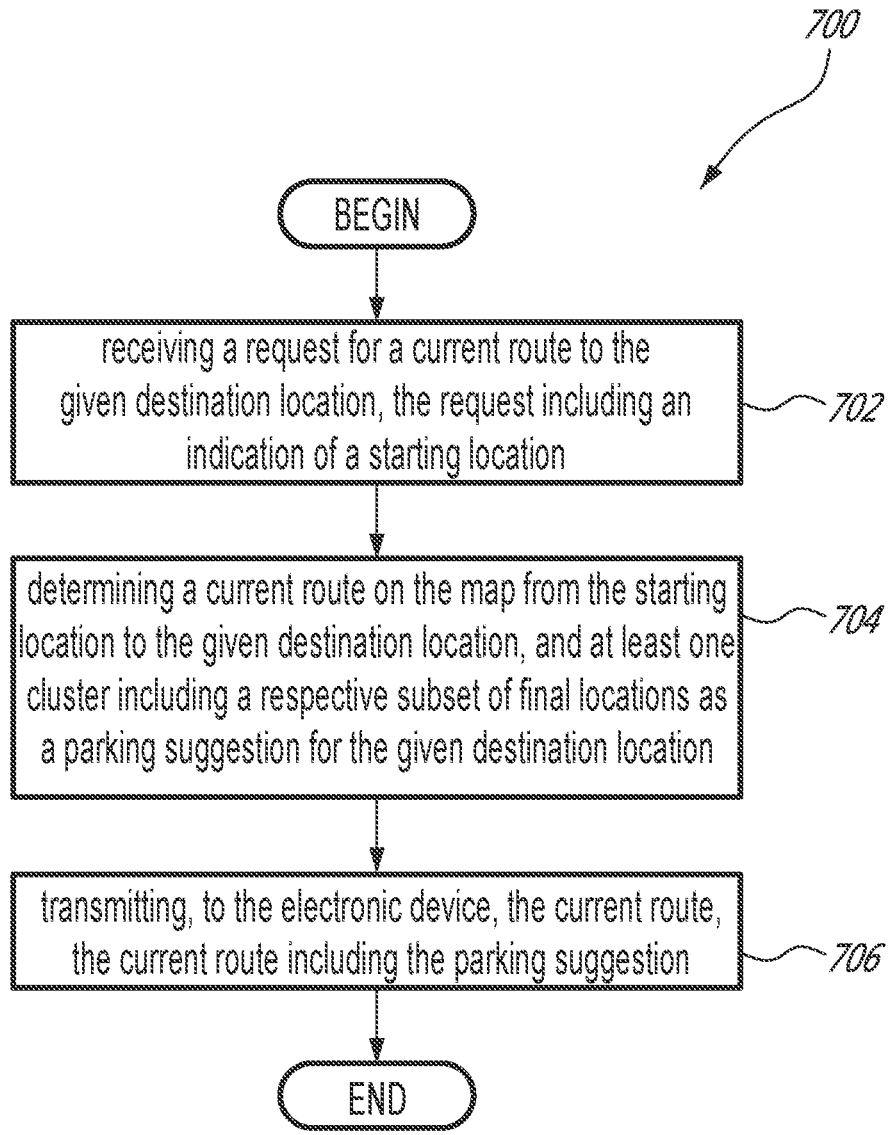
FIG. 7 depicts a flow chart of a method of providing parking suggestions for a destination location to a user of an electronic device

Now turning to FIG. 7 there is depicted a method 700 of providing parking suggestions for a destination location to a user of an electronic device, such as the first user 206 associated with the first electronic device 204.

The method 700 is executed by the server-side map application 282 of the server 230 after execution of the method 600.

The method 700 begins at step 702.

STEP 702: receiving a request for a current route to the given destination location, the request including an indication of a starting location At step 702, the server-side map application 282 of the server 230 receives the map request 236 from the first electronic device 204 for a current route to the destination location 312, the map request 236 including an indication of a starting location 308.

The method 700 advances to step 704.

STEP 704: determining a current route on the map from the starting location to the given destination location, and at least one cluster including a respective subset of final location as a parking suggestion for the given destination location At step 704, the server-side map application 282 of the server 230 determines a current route on the map section 300 from the starting location 308 to the destination location 312, and at least one cluster 484 including a respective subset of the set of final locations 320 as a parking suggestion for the destination location 312 The manner in which the current route from the starting location to the destination location 312 is determined is not limited, and may be generated by considering distance, traffic, time of the day, and other factors to minimize time of travel of the user in his or her vehicle. In some embodiments of the present technology, the server-side map application 282 may first select at least one cluster 484 including a respective subset of the set of final locations 320 as a parking suggestion for the destination location 312 (as an example based on past availability of parking in a similar time period), and generate a current route based on the at least one cluster 484.

The method 700 advances to step 706.

STEP 706: transmitting, to the electronic device, the current route, the current route including the parking suggestion.

At step 706 the server-side map application 282 of the server 230 transmits to the map application 280 of the third electronic device 216 the current route to the destination location 312, the current route including the at least one cluster 484 including the respective subset of the set of final locations 320 as parking suggestions.

The method 700 then ends.

It should be apparent to those skilled in the art that at least some embodiments of the present technology aim to expand a range of technical solutions for addressing a particular technical problem, namely improving determination of parking suggestions for a given destination location based on past user data and by using a minimal spanning tree algorithm as a hierarchical clustering algorithm, which improves time required to generate a set of clusters as parking suggestions on the server, and may provide more satisfactory suggestions to users of client devices. Such technical solutions may allow saving resources such as storage space, bandwidth and time on client devices, as well as on the server.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for determining parking suggestions for a given destination location on a map, the parking suggestions being displayable on the map, the map being displayable on an electronic device, the method executable by a server, the server being connectable to the electronic device and to a database, the server executing a clustering algorithm, the method comprising:
  acquiring, from the database, based on the given destination location, a set of past routes having been taken on the map by users associated with respective electronic devices, each respective past route of the set of past routes terminating at the given destination location;
  determining, by the server, a set of final locations associated with the set of past routes, each final location being an actual ending location of at least one respective user of a respective electronic device having taken the respective past route to the given destination location on the map, each final location being a candidate parking suggestion;
  acquiring, from the database, a road graph of the map, the road graph including a set of map objects, each map object having:
    a respective object location, and
    a respective object class, the respective object class being indicative of a respective type of structure on the map;
  clustering, by the server, the set of final locations to obtain a set of clusters, each cluster including a respective subset of final locations, each cluster of at least a portion of the set of clusters being associated with at least one map object and the associated respective object location, the clustering being based on:
    the given destination location,
    the respective final locations,
    the respective object locations, and
    the respective classes of the respective map objects;
  receiving, from the electronic device, a request for a current route to the given destination location, the request including an indication of a starting location;
  determining, by the server, a current route on the map from the starting location to the given destination location and at least one cluster including a respective subset of final locations as a parking suggestion for the given destination location; and
  transmitting, to the electronic device, the current route, the current route including the parking suggestion.

2. The method of claim 1, wherein the determining the set of final locations is based on a respective distance between each final location and the given destination location being below a predetermined threshold.

3. The method of claim 2, wherein
  the respective object class is indicative of a level of hierarchy of the respective map object on the road graph; and wherein
  the clustering is executed in a hierarchical manner.

4. The method of claim 3, wherein
  each cluster has a respective centroid and a respective size; and wherein
  the determining the at least one cluster including the respective subset of final locations as the parking suggestion is based on the respective centroid and the respective size of the at least one cluster.

5. The method of claim 4, wherein the clustering is performed by using a heuristic evaluation function.

6. The method of claim 5, wherein the clustering algorithm is based on Kruskal's algorithm.

7. The method of claim 6, wherein the set of clusters has a predetermined number of clusters.

8. The method of claim 2, wherein
  each past route is associated with a respective period of time spent by the at least one user of the respective electronic device at the final location; and wherein
  the determining the set of final locations is further based on the period of time being above a predetermined time threshold.

9. The method of claim 6, wherein the method further comprises, prior to the clustering: associating, by the server, each final location of at least a portion of the set of final locations with at least one map object based on a respective distance between the final location and the at least one respective object location associated with each of the at least one map object.

10. The method of claim 7, wherein the respective object class is one of:
  a road segment,
  a roadblock, and
  a known parking location.

11. The method of claim 10, wherein the road segment class includes one of: a freeway, an arterial road, a collector road, and a local road.

12. A server for determining parking suggestions for a given destination location on a map, the parking suggestions being displayable on the map, the map being displayable on an electronic device connected to the server, the server being connected to a database, the server comprising:
  a processor;
  a non-transitory computer-readable medium comprising instructions;
  the processor, upon executing the instructions, being configured to:
    acquire, from the database, based on the given destination location, a set of past routes having been taken on the map by users associated with respective electronic devices, each respective past route of the set of past routes terminating at the given destination location;
    determine a set of final locations associated with the set of past routes, each final location being an actual ending location of at least one respective user of a respective electronic device having taken the respective past route to the given destination location on the map, each final location being a candidate parking suggestion;
    acquire, from the database, a road graph of the map, the road graph including a set of map objects, each map object having:
      a respective object location, and
      a respective object class, the respective object class being indicative of a respective type of structure on the map;
    cluster the set of final locations to obtain a set of clusters, each cluster including a respective subset of final locations, each cluster of at least a portion of the set of clusters being associated with at least one map object and the associated respective object location, the clustering being based on:
      the given destination location,
      the respective final locations,
      the respective object locations, and the respective classes of the respective map objects;
receive, from the electronic device, a request for a current route to the given destination location, the request including an indication of a starting location;
determine a current route on the map from the starting location to the given destination location and at least one cluster including a respective subset of final locations as a parking suggestion for the given destination location;
transmit, to the electronic device, the current route, the current route including the parking suggestion.

13. The server of claim 12, wherein the determining the set of final locations is based on a respective distance between each final location and the given destination location being below a predetermined threshold.

14. The server of claim 13, wherein
the respective object class is indicative of a level of hierarchy of the respective map object on the road graph; and wherein
the clustering is executed in a hierarchical manner.

15. The server of claim 14, wherein
each cluster has a respective centroid and a respective size; and wherein
the determining the at least one cluster including the respective subset of final locations as the parking suggestion is based on the respective centroid and the respective size of the at least one cluster.

16. The server of claim 15, wherein the clustering is performed by using a heuristic evaluation function.

17. The server of claim 16, wherein the clustering algorithm is based on Kruskal's algorithm.

18. The server of claim 17, wherein the set of clusters has a predetermined number of clusters.

19. The server of claim 13, wherein
each past route is associated with a respective period of time spent by the at least one user of the respective electronic device at the final location; and wherein
the determining the set of final locations is further based on the period of time being above a predetermined time threshold.

20. The server of claim 17, wherein the processor is further configured to, prior to the clustering:
associate each final location of at least a portion of the set of final locations with at least one map object based on a respective distance between the final location and the at least one respective object location associated with each of the at least one map object.

* * * * *